Feb. 6, 1968   V. T. FORSTER   3,367,413
COOLING TOWERS

Filed Jan. 18, 1966   2 Sheets-Sheet 1

APPLICANT
Vincent Trevor Forster
BY Misegades & Douglas
ATTORNEYS

Feb. 6, 1968     V. T. FORSTER     3,367,413
COOLING TOWERS
Filed Jan. 18, 1966     2 Sheets-Sheet 2

United States Patent Office 3,367,413
Patented Feb. 6, 1968

3,367,413
COOLING TOWERS
Vincent Trevor Forster, Rugby, England, assignor to The English Electric Company Limited, Rugby, England, a British company
Filed Jan. 18, 1966, Ser. No. 521,260
Claims priority, application Great Britain, Jan. 26, 1965, 3,404/65
8 Claims. (Cl. 165—96)

ABSTRACT OF THE DISCLOSURE

The invention relates to cooling towers of the kind comprising a hollow tower and a plurality of separate planar coolers spaced around the base of the tower in a peripheral air inlet opening, each cooler being of the kind in which a fluid is cooled by indirect heat exchange with air flowing through the cooler and into the tower. Such cooling towers are normally referred to as dry cooling towers. The object of the invention is to provide an arrangement in which air is encouraged to pass through the coolers even though they may be situated side on or on the leeward side of the tower with respect to the prevailing wind. This is achieved by disposing the coolers in the peripheral opening so that they lie on radial planes extending from the center of the tower and by providing a pivoted shutter in each space between two adjacent coolers, each shutter being arranged so as to pivot from a first shutter position in which it extends from the outer end of one cooler to the inner end of the adjacent cooler, and a second shutter position in which it extends from the outer end of said adjacent cooler and the inner end of said one cooler.

This invention relates to cooling towers comprising a hollow tower and a plurality of separate coolers arranged in an air inlet opening of the tower, each cooler being of the kind in which a fluid is cooled by indirect heat exchange with the air flowing through the cooler.

According to the invention, the coolers are arranged with spaces between them so that said air flows through each cooler via one or both of the said spaces adjacent thereto, a shutter being arranged in the or each said space between two coolers, the or each said shutter being pivoted on an axis arranged in the corresponding said space midway between the two said coolers and the or each said shutter being movable about said axis between a first shutter position, in which first and second edges of said shutter lie respectively adjacent an outer end of one said cooler and an inner end of the other said cooler so that said shutter guides air through said other cooler, and a second shutter position, in which first and second edges lie respectively adjacent an outer end of said other cooler and an inner end of said one cooler so that the shutter guides air through said one cooler.

According to a preferred feature of the invention, a plurality of said shutters are arranged for simultaneous operation so that each of said plurality of shutters can receive at least the greater part of its air flow only from one side thereof when the shutters are in one or other of said shutter positions.

According to one aspect of the invention, the other or at least one of the shutters comprises a first door pivoted on said axis and arranged so that in said first shutter position said first and second edges thereof lie respectively adjacent an outer end of said one cooler and an inner end of said other cooler, and a second door pivoted on the same axis and movable, when the shutter is in said first shutter position, with respect to said first door between a parallel position, in which the two doors lie parallel to each other for movement together between said first and second shutter positions, and a separate position in which, with said first door in said first shutter position, said second door lies with one edge thereof adjacent said outer end of the said other cooler whereby substantially to prevent air flow through the said space.

According to another aspect of the invention, in each said space a plurality of said shutters are mounted one above the other.

A cooling tower in various forms according to the invention, in which water is cooled by flow of air through a number of radial coolers arranged in vertical planes, will now be described by way of example and with reference to the accompanying drawings, of which:

Figure 1:
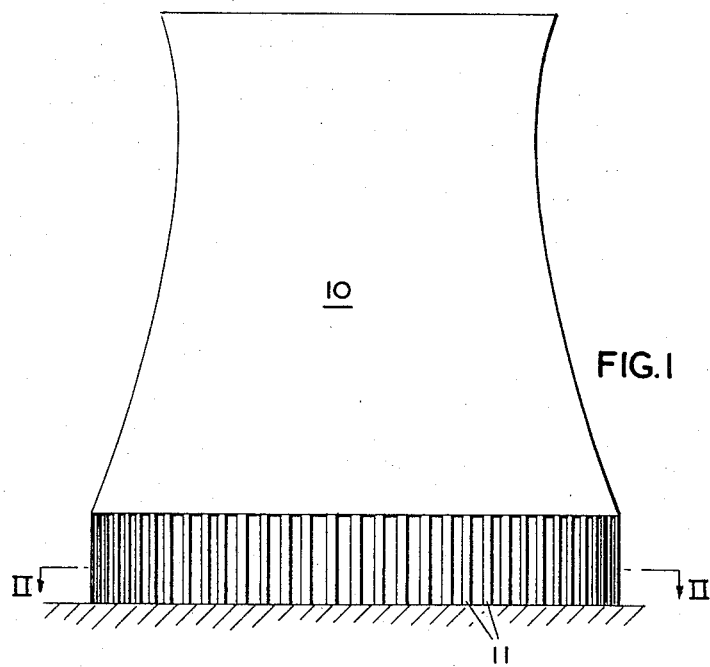
FIG. 1 is simplified elevation of the cooling tower.
Figure 2:
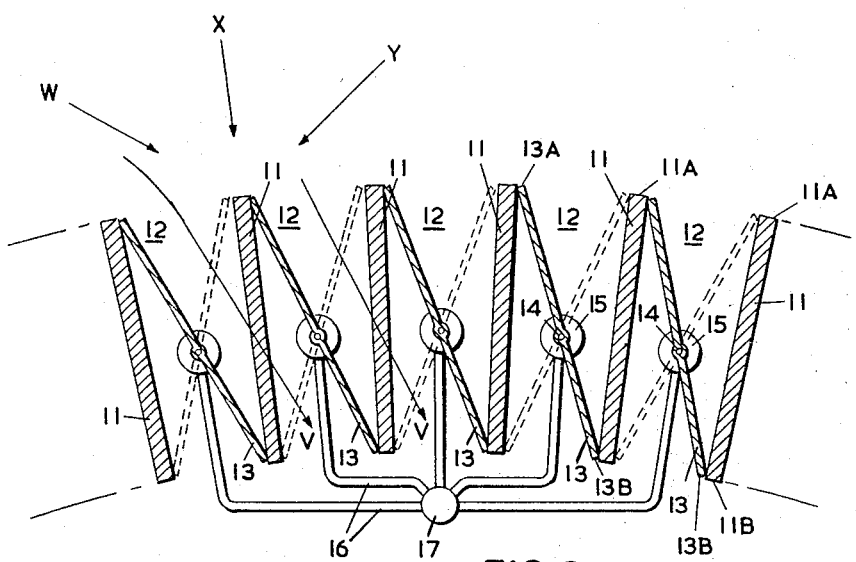
FIG. 2 is a simplified enlarged sectional plan view showing some of the coolers, taken on the line II—II of FIG. 1.

With reference firstly to FIGS. 1 and 2, the cooling tower comprises a hollow tower 10 mounted on supports (not shown) above an air inlet opening, in which there are arranged a number of separate vertically-mounted radially-disposed coolers 11 in which the water flows in enclosed ducts (not shown), to be cooled by indirect heat exchange with air drawn by convection through spaces 12 between the coolers 11 into the tower 10.

Between each pair of coolers 11, in each space 12, there is mounted a shutter 13 which is pivoted about a vertical pillar 14 midway between the two coolers. Each shutter 13 is controlled by a hydraulic actuator 15. The actuators 15 of a group of several adjacent shutters are controlled through pipes 16 from a single control unit 17, so that all the shutters in the group move simultaneously. There are a number of such groups, although only one group is shown in FIG. 2.

When the wind outside the cooling tower and adjacent the coolers is in a general direction from left to right as seen in FIG. 2, for example, as indicated by the arrow W (the interior of the cooling tower being at the bottom of the figure), the shutters 13 are in a first shutter position, as shown by full lines, with the outer edge 13A of each shutter adjacent the outer end 11A of one cooler and the inner edge 13B of each shutter adjacent the inner end 11B of the other cooler. In this position the air can only enter each cooler from the windward side, so that substantially all the air is guided through the coolers by the shutters 13. The air is thus deflected by the shutters 13 through an angle which is always less than 90°.

If the general wind direction is from right to left as seen in FIG. 2 (for example as indicated by the arrow Y), the shutters 13 are moved by their motors to a second shutter position, shown by broken lines, in which the edges 13A, 13B lie adjacent the respective ends 11A, 11B of the opposite coolers from those associated with them in the first position. The same effect, i.e. deflection of air through less than 90°, is thus maintained. If the general wind direction is radial (as indicated by the arrow X) the shutters 13 may be in either position.

Figure 3:
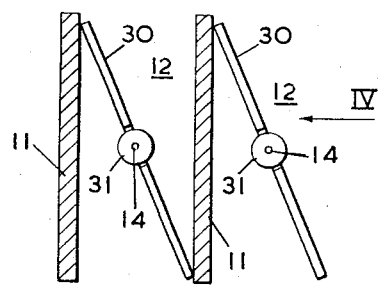
FIG. 3 is a simplified enlarged sectional plan view, similar to FIG. 2 but taken on the line III—III of FIG. 4 and showing two of the coolers according to a modified form of the invention.
Figure 4:
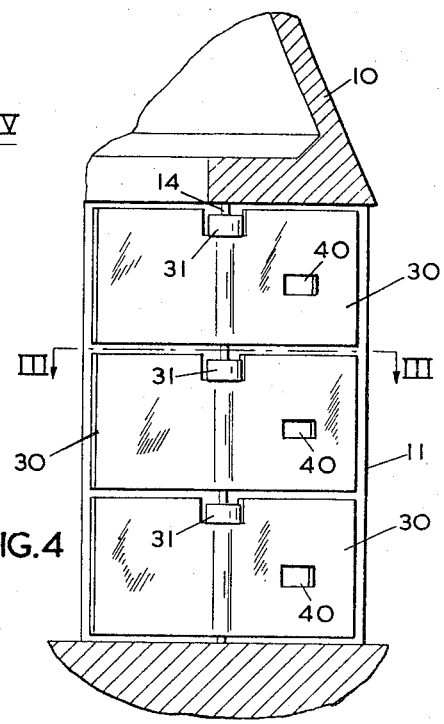
FIG. 4 is a simplified sectional elevation taken in the direction of the arrow IV in FIG. 3.

With reference now to FIGS. 3 and 4, in another embodiment there are a number of shutters 30 mounted one above the other between each pair of coolers 11, each shutter being actuated independently by its own actuator 31. In such a case the actuators can be arranged so that all the shutters 13 between each pair of coolers can be operated together if required. The actuators 30 may be in any suitable location: in the example shown they are mounted in the pillar 14.

FIG. 4 shows a small opening 40 in each shutter 30. The openings 40 allow a small quantity of air to pass through a cooler even when the shutters are in a position to prevent the greater part of the air flow passing through. Such openings may be provided in shutters according to any other form of the invention, for example those shown in FIG. 2, and may be variable so as to regulate, or shut off completely, the flow of air through them.

In either of the examples just described, a suitable control system may be provided for operating the actuators automatically in response to changes in wind direction.

Figure 5:
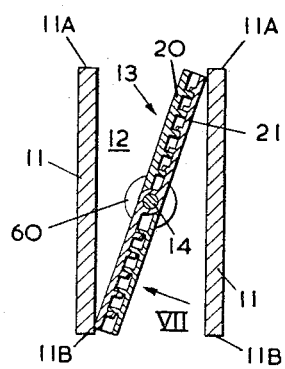
FIGS. 5 and 6 are simplified sectional plan views each showing two of the coolers according to a further modified form of the invention, taken on the line V—V of FIG. 7.
Figure 6:
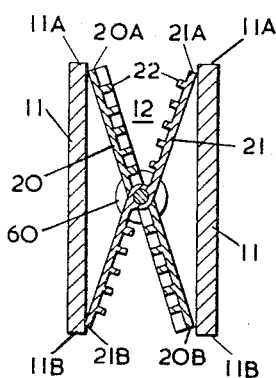
Figure 7:
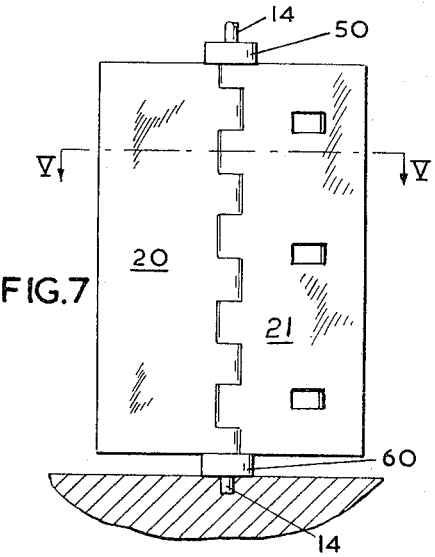
FIG. 7 is a simplified sectional elevation of a shutter, taken on the arrow VII in FIG. 5.

With reference now to FIGS. 5 to 7, in a modification of the invention each shutter comprises a cold weather door 20 and a wind door 21, both said doors being pivoted independently on the fixed pillar 14. The wind door 21 is actuated by a hydraulic actuator 50 for operation as described above between said first (as shown in FIG. 5) and second shutter positions. In the first shutter position the outer edge 21A of the door 21 lies adjacent the outer end 11A of one cooler and the inner edge 21B of door 21 lies adjacent the inner end 11B of the other cooler. Locking means (not shown) are provided for locking the cold weather door 20 to the wind door 21 so that the two doors 20, 21 normally lie together in parallel position, as shown for example in FIG. 5, for movement between said first and second shutter positions by the actuator 50, the two doors comprising a single shutter. The two doors 20, 21 may be provided with interlocking stiffening ribs 22.

In very cold weather the shutter can be moved to a separated position shown in FIG. 6, in which the edges 20A, 20B of the cold weather door 20 lie adjacent the outer and inner ends 11A, 11B of the respective coolers not associated in this shutter position with the wind door 21. This is done by unlocking the locking means and moving the cold weather door 20 by means of an actuator 60, the wind door 20 remaining stationary. The shutter now closes the space 12 between the coolers 11, so reducing the possibility of the coolers freezing up.

If required, the wind door 21 or cold weather door 20, or both, may be provided with openings (not shown), similar to the openings 40 in FIG. 4, and variable or fixed in size. Such openings, if variable, may be operable remotely in response to air temperature. Similarly the locking means may be unlocked, and the door 20 moved to the separated position shown in FIG. 6, in response to operation of control means (not shown) responsive to air temperature.

If desired, only the wind door 21 may be extended on both sides of the pillar 14, the door 20 extending only from the pillar 14 towards the outside of the cooling tower; in other words, FIG. 6 can be modified so that in this alternative arrangement there is only one door below the common pivot of the two doors.

The invention is not confined to use with cooling towers of the kind described, but may be used for example in cooling towers of the forced-draught type.

It will be understood that the use of hydraulic actuators is not essential to the invention: any suitable means for operating the shutters may be employed, for example electric or pneumatic motors or actuators.

All the examples described may be modified if desired by providing a control system by which all the shutters in the cooling tower are actuated simultaneously. Similarly, all the cold weather doors 20 may be made to operate simultaneously.

The coolers, and the axes of the shutters, need not be arranged in vertical planes: nor need the sides of the coolers be flat. The coolers may for example be inclined to the vertical, or horizontal: the axes of the shutters will then be arranged in such a position that it is still possible to obtain control of air flow through the coolers as described herein.

What I claim as my invention and desire to secure by Letters Patent is:

1. A cooling tower of the kind comprising a hollow tower and a plurality of separate planar coolers arranged around the base of the tower defining spaces therebetween in a peripheral air inlet opening, each cooler being of the kind in which a fluid is cooled by indirect heat exchange with air flowing through the cooler and into the tower, wherein the improvement comprises each said cooler lying in a radial plane extending from the center of the tower, a centrally pivoted shutter arranged in each said space between two adjacent coolers, the axis of said pivoted shutter lying in a mid-position in said space and extending in the direction of the height of the tower so that the shutter is pivotal about said axis between a first shutter position in which first and second edges of said shutter lie respectively adjacent an outer end of one said cooler and an inner end of the other said cooler so that said shutter guides air through said other cooler, and a second shutter position in which said first and second edges lie respectively adjacent an outer end of said other cooler and an inner end of said one cooler so that the shutter guides air through said one cooler.

2. A cooling tower according to claim 1, wherein means are provided for pivoting a plurality of said shutters between their said first and second shutter positions simultaneously.

3. A cooling tower according to claim 1, wherein each shutter comprises a first door pivoted on said axis and arranged so that in said first shutter position said first and second edges thereof lie respectively adjacent an outer end of said one cooler and an inner end of said other cooler, and a second door pivoted on the same axis and movable, when the shutter is in said first shutter position, with respect to said first door between a parallel position, in which the two doors lie parallel to each other for movement together between said first and second shutter positions, and a separated position in which, with said first door in said first shutter position, said second door lies with one edge thereof adjacent said outer end of the said other cooler whereby substantially to prevent air flow through the said space.

4. A cooling tower according to claim 3 including locking means arranged for locking said doors together when the doors are in said parallel position.

5. A cooling tower according to claim 3, wherein a hydraulic actuator is provided for each shutter for moving the second door between its parallel and separated position.

6. A cooling tower according to claim 1 including at least one opening in the, or each, shutter to allow a relatively small quantity of air to flow through the shutter.

7. A cooling tower according to claim 1, wherein in each said space a plurality of said shutters are mounted one above the other.

8. A cooling tower according to claim 7, wherein each shutter of said plurality thereof is arranged for operation independently of the others in the same space.

References Cited

UNITED STATES PATENTS

| 2,380,026 | 7/1945 | Clarke | 165—96 X |
| 3,259,177 | 7/1966 | Niemann | 165—101 X |

FOREIGN PATENTS

| 630,823 | 10/1949 | Great Britain. |

ROBERT A. O'LEARY, *Primary Examiner.*

T. W. STREULE, *Assistant Examiner.*